(12) United States Patent
Geka et al.

(10) Patent No.: US 7,832,930 B2
(45) Date of Patent: Nov. 16, 2010

(54) LINEAR MOTION GUIDE UNIT

(75) Inventors: Toshiaki Geka, Kamakura (JP); Hideki Kuwabara, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 474 days.

(21) Appl. No.: 11/928,263

(22) Filed: Oct. 30, 2007

(65) Prior Publication Data
US 2008/0260307 A1    Oct. 23, 2008

(30) Foreign Application Priority Data
Oct. 30, 2006    (JP) .............................. 2006-293645

(51) Int. Cl.
*F16C 29/06* (2006.01)
(52) U.S. Cl. .............................. 384/44; 384/7; 384/15; 384/51
(58) Field of Classification Search ................... 384/13, 384/15, 43–45, 49, 51, 7
See application file for complete search history.

(56) References Cited

U.S. PATENT DOCUMENTS

| | | | | |
|---|---|---|---|---|
| 4,582,369 A * | 4/1986 | Itoh | ............................. | 384/13 |
| 4,988,215 A * | 1/1991 | Osawa | ......................... | 384/44 |
| 5,193,914 A * | 3/1993 | Tanaka | ......................... | 384/45 |
| 5,380,097 A * | 1/1995 | Tanaka | ......................... | 384/13 |
| 5,391,003 A * | 2/1995 | Ooya | ............................ | 384/44 |
| 5,871,282 A * | 2/1999 | Yuasa | ........................... | 384/15 |
| 6,712,511 B2 * | 3/2004 | Matsui et al. | ................. | 384/45 |
| 6,729,761 B2 * | 5/2004 | Matsui et al. | ................. | 384/45 |
| 6,766,897 B2 * | 7/2004 | Kuwabara | ................ | 198/750.1 |
| 7,066,650 B2 * | 6/2006 | Ishihara | ....................... | 384/44 |
| 7,341,378 B2 * | 3/2008 | Kuwabara | .................... | 384/44 |
| 7,354,198 B2 * | 4/2008 | Nishihara | .................... | 384/13 |
| 2007/0071372 A1 * | 3/2007 | Kuwabara et al. | ............. | 384/44 |

FOREIGN PATENT DOCUMENTS

| | | |
|---|---|---|
| JP | 07-091446 A | 4/1995 |
| JP | 2002-005162 A | 1/2002 |
| JP | 2004-144146 A | 5/2004 |

* cited by examiner

*Primary Examiner*—Marcus Charles
(74) *Attorney, Agent, or Firm*—Browdy and Neimark PLLC

(57) ABSTRACT

An interlocking construction between an end cap and a retainer plate to support rollers in a load-carrying race is made to provide an endless circulating circuit with no gap to allow the rollers smoothly rolling through there with keeping adequate posture. The slider has a carriage, end caps, rollers rolling through a circulating circuit, a retainer plate extending along the load-carrying race to keep the rollers inside the load-carrying race, and a binding strip to fasten the retainer plate to the carriage. The retainer plate comes into connection with spigots extending out of the end caps. Lengthwise opposite ends of the retainer plate conform to ends of the spigots in a complementary relation to fit over the ends of the spigots in a sliding direction.

6 Claims, 8 Drawing Sheets

LINEAR MOTION GUIDE UNIT

FIELD OF THE INVENTION

The present invention relates to a linear motion guide unit comprised of an elongated guide rail, and a slider that is allowed to move on the elongated guide rail relative to the guide rail by virtue of more than one rolling element.

BACKGROUND OF THE INVENTION

Conventionally, the linear motion guide unit is constituted in a fashion a slider is allowed to travel along an elongated guide rail through more than one rolling element. The recently remarkable development in mechanical engineering technology call for various sorts of linear motion guide units, especially, linear motion guide units of the type using a rolling element of cylindrical roller, which will carry heavy loads even though miniature in dimension. Advanced linear motion guide units are used in any relatively sliding components in machinery as diverse as semiconductor fabricating equipment, machine tools, assembling machines, conveyers, and so on, and further expected to find more extensive application to various sort of machinery. The linear motion guide units designed especially to work on semiconductor fabricating equipment, measurement/inspection instruments, and so on are needed to meet all the duties of micromechanical construction, high-speed sliding performance, high mechanical stiffness, and high accuracy while getting smaller and smaller in construction. Rollers in the linear motion guide units are expected to roll through a circulating circuit composed of a load-carrying race defined between a guide rail and a slider, a return passage made in the slider, and turnaround passages made in the slider to communicate the load-carrying race and the associated non-loaded return passage with each other.

In the commonly assigned Japanese Patent Laid-Open No. H07-91446, there is disclosed a linear motion guide unit in which a retainer means to keep more than one rolling element of cylinder, or roller, is held in place by means of just snap-fit operation and serves to increase permissible load rating. The retainer means is composed of a retainer plate to support the rollers and a holder band coming into engagement with the retainer plate to fasten the retainer plate to a carriage of a slider. The retainer plate may be fastened to the carriage with certainty and ease after the holder band has just snap-fit into the carriage. With the linear motion guide unit constructed as stated earlier, the retainer plate is placed to extend between the upside and downside load-carrying races made on the carriage. The holder band has a major portion to fit into a lengthwise recess made through the retainer plate and forward and aft end caps and lengthwise opposite bent ends to come into snap-engagement with their associated holes in the end caps. After the retainer means has been incorporated into the slider, the rollers are held in the load-carrying races defined between the guide rail and the carriage of the slider.

Another linear rolling guide system is disclosed Japanese Patent Laid-Open No. 2002-5162 in which joint construction between leading and trailing guide rail sections is especially designed to relieve severe concentration of stress at the butting construction against each other and further keep the rollers against getting caught or falling in any gap left between adjoining guide rail sections, making sure of smooth transfer of the rollers from any one of the guide rail sections to the other. The linear motion guide system is comprised of the guide rail having lengthwise load-carrying races, a sliding carriage fitting over the guide rail in a way traveling relative to the guide rail, and many rollers rolling through an endless circulating circuit. The guide rail is constructed with guide rail sections lined up end-to-end. The joint where the adjacent guide rail sections are butted each other is oriented to intersect with the rotational axes of the rollers running through the load-carrying races.

A further another sort of linear motion guide means is disclosed in Japanese Patent Laid-Open No. 2004-144146, which is envisaged getting the number of gaps in an endless circulating circuit, which might cause any resistance that is encountered when a retainer runs through there, as less as possible, making sure of not only smooth traveling of the retainer, but also smooth circulation of the rollers. With the linear motion guide means constructed as stated earlier, a carriage that fits over or conforms to a guide rail to move relatively to the guide rail is made therein with the endless circulating circuit made up of a load-carrying race, a non-loaded return passage extending in parallel with the load-carrying race and a pair of non-loaded turnaround passages to communicate the load-carrying race and the return passage with each other. The rollers inside the endless circulating circuit are held in the retainer to roll and run sequentially. The endless circulating circuit is made throughout with a lengthwise recess in which there is snugly accommodated guide members having guiding area to control the movement of a connecting band to keep the retainers at desired intervals.

The recent linear motion guide units, even though more miniature in construction, are needed to extensively meet all the duties of high-speed sliding performance, high mechanical stiffness, and high accuracy. There is a major challenge about how the miniature linear motion guide units using small rollers as the rolling elements are applied to extensively various types of machinery. To cope with this, it is very critical to make certain of smooth rolling of the rollers throughout the entire circulating circuit in the linear motion guide unit. In particular, when using the miniature rollers or needles, it is severe to make the rollers roll or tread without any obstacle across boundary lines in the circulating circuit, especially, a boundary between the load-carrying race and the associated turnaround passage. Moreover, it is inevitable to guide the rollers with smooth but no tilt.

In the linear motion guide units in which the small rollers or needles are selected as rolling elements, alignment problems to guide rollers in good rolling order without leaning in rolling posture are more encountered, compared with the construction using balls. The prior linear motion guide units as recited earlier can be, to some extent, applied to comparatively small rollers, nevertheless, miniature rollers extremely small in size, for example rollers of 1 mm or so in diameter, poses a new challenge whether they are allowed to roll orderly and smoothly without encountering any obstacle when rolling across boundaries where parts or members including end caps, carriage, retainer plates, and so on abut against one another in the endless circulating circuit. As opposed to the linear motion guide units using the balls as the rolling elements, the rollers or needles have to be guided not only on their circular surfaces, but also on their axially opposite end surfaces to run through the circulating circuit without leaning in rolling posture with respect to the running direction. As for the miniature rollers, even a tiny gap at a boundary between butting members could cause any obstacle to rolling movement of the rollers. This means there is a significant challenge to ensure smooth, steady rolling motion of the miniature rollers.

With the prior linear motion guide units, the boundary 28 between the retainer plate 13 and the leading edge 29 of the end cap 4, as shown in FIG. 13, is largely beveled or chamfered at 35. The roller 5 collides readily against the bevel edge 35 to get caught at the associated circular corner. The trapped roller 5 eventually contorts the leading edge 29 of the end cap 4, which is thin in thickness, into the damage and interferes with smooth rolling of subsequent rollers. It is moreover to be understood that the boundary 28 in the circulating circuit normally conforms to a specific location where the end cap 4 butts against the edge 34 of the carriage 3, or the turnaround passage 30 of the end cap 4 and the raceway surface 12, that is, the load-carrying race 20 of the carriage 3 join together so that the roller 5 will tend to lean to any lopsided posture. Thus, there is a question how the roller 5 rolls with no obstacle across the boundary between members butting together.

SUMMARY OF THE INVENTION

The present invention has for its primary object to overcome the shortcomings as stated earlier, and to provide a linear motion guide unit constructed to ensure a roller rolls steadily and smoothly. More particularly, the present invention provides a linear motion guide unit in which a retainer plate is installed along a load-carrying race defined between a raceway surface on a guide rail and a raceway surface in a carriage of a slider, the load-carrying race communicating with a turnaround passage in an end cap in such a way that the retainer plate and an edge of the end cap butt against each other end-to-end with no gap at a boundary between the retainer plate and the edge of the end cap, keeping the roller against leaning and falling into any gap.

The present invention is concerned with a linear motion guide unit comprising an elongated guide rail having a first lengthwise raceway surface thereon, and a slider movable lengthwise of the elongated guide rail, the slider being comprised of a carriage made therein with a second raceway surface in opposition to the first raceway surface and a return passage extending in parallel with a load-carrying race defined between the first and second raceway surfaces, end caps mounted on lengthwise opposite ends of the carriage and made therein with turnaround passages connecting the load-carrying race with the associated return passage, more than one roller allowed to roll through a circulating circuit composed of the load-carrying race, the return passage and the turnaround passages, a retainer plate extending lengthwise in opposition to the load-carrying race to keep the roller in the load-carrying race, and a binding strip to fasten the retainer plate to the carriage;

wherein the end caps each have spigots extending out of an end of the end cap to come into communication with the associated turnaround passages, while the retainer plate is made at lengthwise opposite ends thereof to make connections with their spigots to guide axially opposite ends of the roller, and the lengthwise opposite ends of the retainer plate conform to associated ends of the spigots in complementary to fit over the associated ends of the spigots in a sliding direction.

In an aspect of the present invention, there is disclosed a linear motion guide unit in which butting extremities of the retainer plate and the spigots are made beveled ends, stepwise ends or stepwise bevel ends in complementary relation to one another aslant in the sliding direction.

In another aspect of the present invention, there is disclosed a linear motion guide unit in which the retainer plate is made at opposite ends thereof with raised portions, which are squeezed by application of a binding strip to firmly fasten the retainer plate against the carriage.

In another aspect to the present invention, there is disclosed a linear motion guide unit in which the binding strip is warped around a middle area thereof to get convex towards the carriage to form a somewhat flexed middle, and wherein the binding strip fastened to the retainer plate with lengthwise opposite hooks coming into engagement with notches of the end caps is borne against the retainer plate at three points of lengthwise opposite raised ends and the convex middle of the retainer plate to keep firmly the retainer plate in place relative to the carriage.

In another aspect of the present invention, there is disclosed a linear motion guide unit in which the carriage is made with a groove, which extends along the load-carrying race to fit over a wedged ridge where the retainer plate comes into mating with the spigot of the end cap.

In a further another aspect of the present invention, there is disclosed a linear motion guide unit in which a pair of the circulating circuit is made to each of sidewise bulged portions of the slider, and wherein the retainer plate is arranged between the paired circulating circuits and provided with guide surfaces to bear the rollers rolling through the load-carrying races against their axially opposite ends.

With the linear motion guide unit constructed as stated earlier, the retainer plate to keep the rollers in the load-carrying race is made at the lengthwise opposite ends thereof into beveled ends, stepwise ends or stepwise bevel ends to fit over in the sliding direction the spigots extending out of the end cap. This complementary fit between the retainer plate and the spigots keeps the boundary between the butting ends thereof against causing any gap between them, helping the rollers transfer from the load-carrying race to the turnaround passage and vice versa without getting caught or falling in any gap that would otherwise be liable to occur between butting ends, making sure of smooth and orderly travel of the rollers throughout the circulating circuits.

BRIEF DESCRIPTION OF THE DRAWINGS

FIGS. 5(a) and 5(b) are views explanatory of the butting relation of a retainer plate against a carriage as well as an end cap, in which FIG. 5(a) is a fragmentary view in transverse section taken along a plane of the line Va-Va of FIG. 5(b) and FIG. 5(b) is a partial view in plan to illustrate a bevel edge of the retainer plate, which butts against the end cap;

FIGS. 12(a) and 12(b) are fragmentary views in the direction of the arrow (B) of FIG. 2 to illustrate other versions of butting relation of the retainer plate against the carriage as well as the end cap, in which FIG. 12(a) shows the retainer plate having a stepwise edge and FIG. 12(b) is another version having a stepwise bevel edge.

DETAILED DESCRIPTION OF THE PREFERRED EMBODIMENTS

The linear motion guide unit according to the present invention is adapted for use in any relatively sliding components in machinery as diverse as robots, semiconductor fabricating equipments, precision machines, measurement/inspection instruments, medical instruments, micromachines, machine tools, and so on. More particularly, the present invention is envisaged getting a rolling element of small roller to roll smoothly throughout a circulating circuit.

Figure 1:
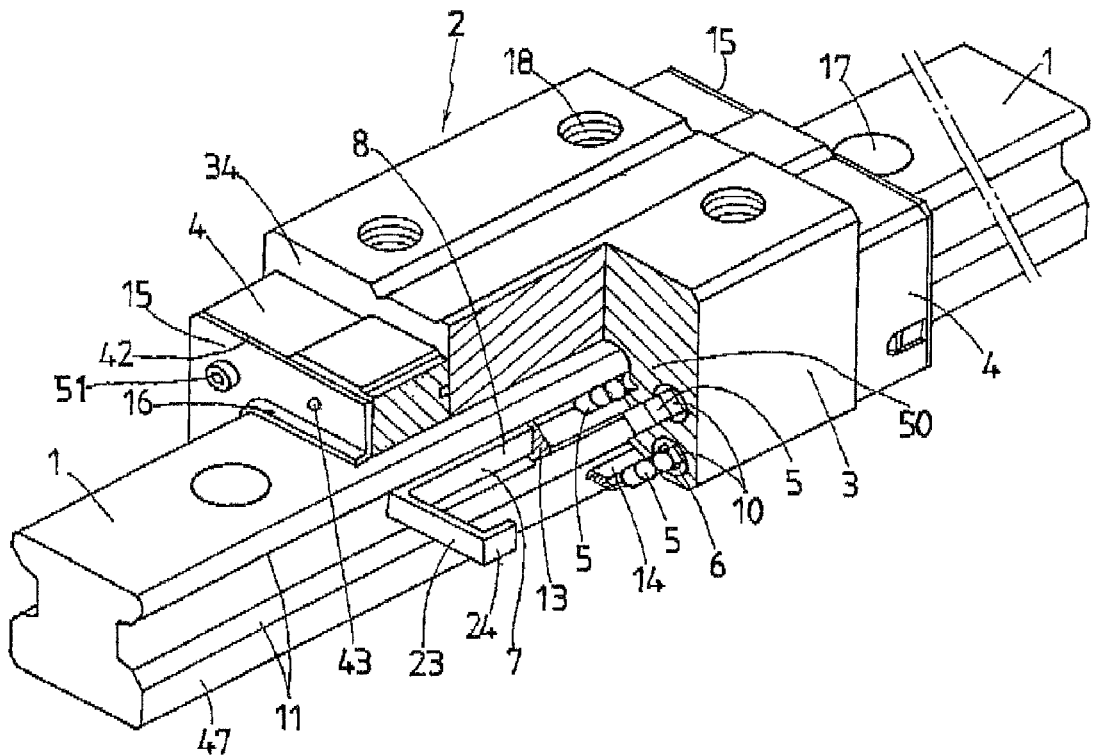
FIG. 1 is a partially cutaway view in perspective illustrating a preferred embodiment of a linear motion guide unit according to the present invention.
Figure 2:
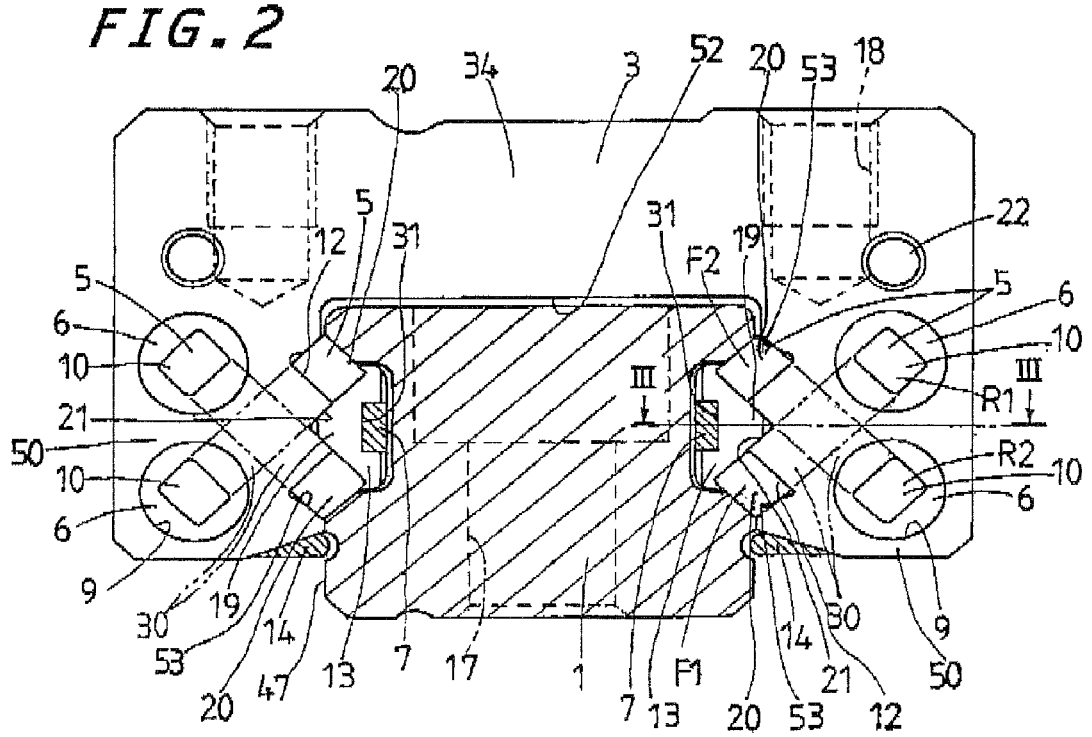
FIG. 2 is a view in end elevation partly in transverse section, showing a carriage of a slider, but in which an end cap is removed from the linear motion guide unit of FIG. 1.

The linear motion guide unit of the present invention is most favorable for the sort whose rolling elements are of rollers 5 as shown in FIGS. 1 to 2, and comprised of an elongated guide rail 1 having widthwise opposing sides 47 on which paired raceway surfaces 11 are made to extend lengthwise of the guide rail 1, one pair to each side, a slider 2 allowed to move lengthwise of the guide rail 1, and more than one roller 5 allowed to roll through a circulating circuit, which is made up of a load-carrying race 20 defined between the guide rail 1 and the slider 2, and a return passage 10 and turnaround passages 30, which are made in the slider 2. The slider 2 is composed of a carriage 3 made thereon with raceway surfaces 12 in opposition to the raceway surfaces 11 cut in the guide rail 1 to provide the upside and downside load-carrying races 20 and made therein with the upside and downside return passages 10 extending in parallel with the load-carrying races 20, and end caps 4 arranged on forward and aft ends 34 of the carriage 3, one to each end, and formed therein with the turnaround passages 30 to communicate any one of the upside and downside load-carrying races 20 with the associated return passage 10. With the linear motion guide unit constructed as stated earlier, the load-carrying races 20 are each defined between the raceway surfaces 11 on the guide rail 1 and the raceway surfaces 12 lying on the carriage 3 in opposition to the raceway surfaces 11. Four rows in all of the load-carrying races 20 are laid on the sidewise bulging portions 50 of the carriage 3, two rows to each bulging portion. The roller 5 has a circular rolling surface 48 and axially opposite ends 49. More than one roller 5 rolling through the load-carrying races 20 is born on any one of axially opposite ends 49 thereof against an elongated retainer plate 13 extending along the race 34 across the carriage 3 and the end caps 4. With the linear motion guide unit of the present invention, moreover, a lower seal 14 is disposed to extend over the underneath of the carriage 3 and the forward and aft end caps 4 while end seals 15 with sealing lips 16 are attached to outward end surfaces of the end caps 4, so that the slider 2 is sealed effectively against outside atmosphere. The guide rail 1 is made with some holes 17 that are used to fasten the guide rail 1 to any stationary bed including machine bed, mounting base, workbench, and so on, while the carriage 3 of the slider 2 is made with threaded holes 18 that are used to install any object including various instruments, works, attachments, and so on thereon.

Figure 10:
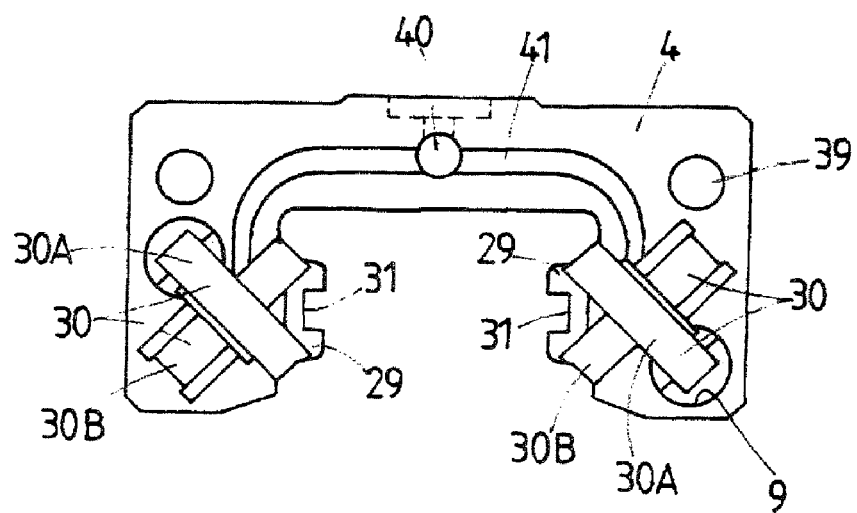
FIG. 10 is a view in rear elevation showing the end cap of FIG. 1.
Figure 11:
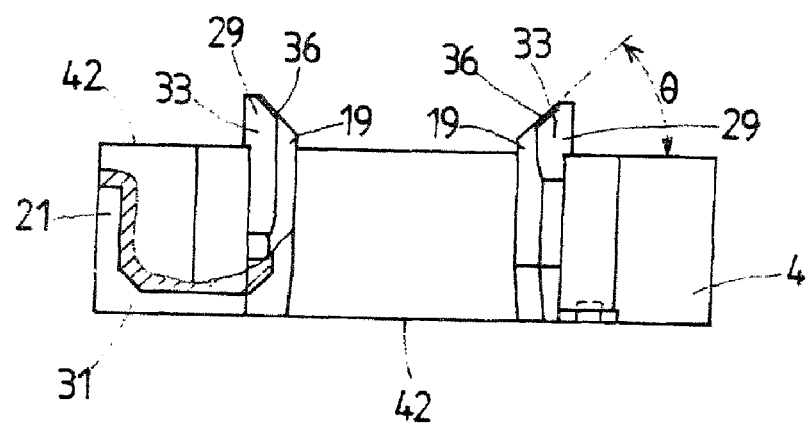
FIG. 11 is a view in bottom plan partly in section, showing the end cap of FIG. 10.

The end caps 4, as shown in FIGS. 1, 10 and 11, are set in alignment with the carriage 3 and fastened to the carriage 3 by means of bolts 51, which are tightened through bolt holes 39 in the end caps 4 into associated threaded holes 22 in the carriage 3. The end caps 4 are each made therein with a lubrication port 40 and a oil path 41 fed with lubricant from any lubricant source, while the end seals 15 are each made with other lubrication port 43 to communicate with the lubrication port 40 of the associated end cap 4. With the linear motion guide unit recited here, the grease nipple cannot be adapted to the end seals 15 due to lack of space for installation of the grease nipple. Instead, there is made a lubrication hole small in diameter (not more than $\Phi=0.5$ mm), which allow a needle of syringe to pass through there. The lubricant is fed through the lubrication ports 40, 43 and the oil paths 41 into the endless circulating circuits. The end caps 4 at their inlets of the turnaround passages 30 are each provided with spigots 29, which are raised above the inward or rearward end of the end cap 4 to extend out of the associated turnaround passage 30 towards the load-carrying race 20. A tubular member 6 to define the return passage 10 fits snugly into a fore-and-aft hole 9 bored in the carriage 3. The tubular member 6 is kept in place inside the fore-and-aft hole 9 by the forward and aft end caps 4 flanking the carriage 3. Thus, the turnaround passage 30 and the return passage 10 are connected with each other to finish the circulating circuit of rectangular shape in transverse section with causing no gap at the connection between the return passage 10 and the turnaround passages 30 so that the rollers 5 are allowed to transfer smoothly from the turnaround passages 30 to their associated return passage 10 and also from the return passage 10 to the turnaround passages 30 in a circulating manner. The tubular member 6 is designed to fit manually easier into the fore-and-aft hole 9 in the carriage 3. The tubular member 6 fits into the fore-and-aft hole 9 with leaving somewhat clearance between them. Thus, the tubular member 6 is not fixed, but loose-fitted inside the fore-and-aft hole 9 and kept against lengthwise changes in position by means of the end caps 4.

The slider 2, as shown in FIG. 2, has the paired circulating circuits in the sidewise bulged portions 50, one circuit pair to each bulged portion. The rollers 5 rolling through any one of the paired circuits circulate from the downside race 20(F1) carrying thereon an downward load of the slider 2 into the upside return passage 10(R1) in the carriage 3 while other rollers 5 running through another circuit circulate from the upside race 20(F2) carrying thereon an upward load of the slider 2 into the downside return passage 10(R1) in the carriage 3. The turnaround passages 30 are made staggered with one another in sidewise bulged portions in the forward and aft end caps 4. The turnaround passages 30 plotted with phantom lines in the right-side bulged portion of the end cap 4 seen in FIG. 2 includes an outer turnaround passage (30B) connecting the load-carrying race 20(F1) and the return passage 10(R1) with one another and an inner turnaround passage (30A) connecting the load-carrying race 20(F2) and the return passage 10(R2) with each other. With the linear motion guide unit constructed as stated earlier, accordingly, when the rollers 5 roll through the load-carrying races 20 defined between the raceway surfaces 11 and the raceway surfaces 12, the rollers 5 existing in the upside load-carrying race 20 circulate into the downside return passage 10 while other rollers 5 in the downside load-carrying race 20 roll into the upside return passage 10, thereby causing the slider 2 to move in a sliding manner relative to the guide rail 1. The rolling elements selected for the linear motion guide unit of the present invention are of rollers 5 very small in size. The rollers 5 in the load-carrying race 20 are kept with the elongated retainer plate 13 against falling apart from the slider 2 even after the slider 2 is dismantled from the guide rail 1. The retainer plate 13 is to define partially define the load-carrying race 20 and, to this end, secured to the carriage 3 by means of binding strip 7 whose opposite ends 24 come into engagement with grooves 26 cut into the end caps 4.

The linear motion guide unit in which the retainer plate to keep the rollers 5 in place is fastened to the carriage 3 with the binding strip 7 further features an interlocking construction between the retainer plate 13 and the end caps 4 to make certain of smooth circulation of the very small or miniature rollers 5. A major problem faced in circulating motion of the miniature rollers in the prior linear motion guide units is that any discrepancy or gap in the interlocking construction between the adjoining parts, even extremely minor, could interfere with the smooth circulation of the miniature rollers. The efforts to make such gaps lessen would entail costly more precise finishing of the parts than done before. With the linear motion guide unit constructed as stated earlier, the retainer plate 13 extends lengthwise along the associated load-carrying race 20 in opposition to the carriage 3 to keep the rollers 5 on the load-carrying race 20 and further the binding strip 7 fastens the retainer plate 13 to the carriage 3. In particular, the retainer plate 13 features a unique interlocking construction with the end caps 4, in which the retainer plate 13 comes into engagement with the spigots 29 raised above the rearward ends of the end caps 4 in a way merging with the turnaround passages 30 to bear the rollers 5 against their axial ends 49. The retainer plate 13 is shouldered or beveled at the lengthwise opposing ends thereof to come into contact complementarily with the spigots 29 of the end caps 4 in a relation to fit over extremities of the spigots 29 of the end caps 4 in the sliding direction. With the linear motion guide unit using, especially, very small or miniature rollers 5, the interlocking geometry between the end caps 4 and the retainer plate 13 as stated just earlier helps the miniature rollers 5 roll though the circulating circuit with smooth and steadiness in very orderly fashion. More especially, the linear motion guide unit discussed here has the guide rail of a matter of 10 mm in width and more than one miniature roller of a matter of 1 mm in diameter.

Figure 5:
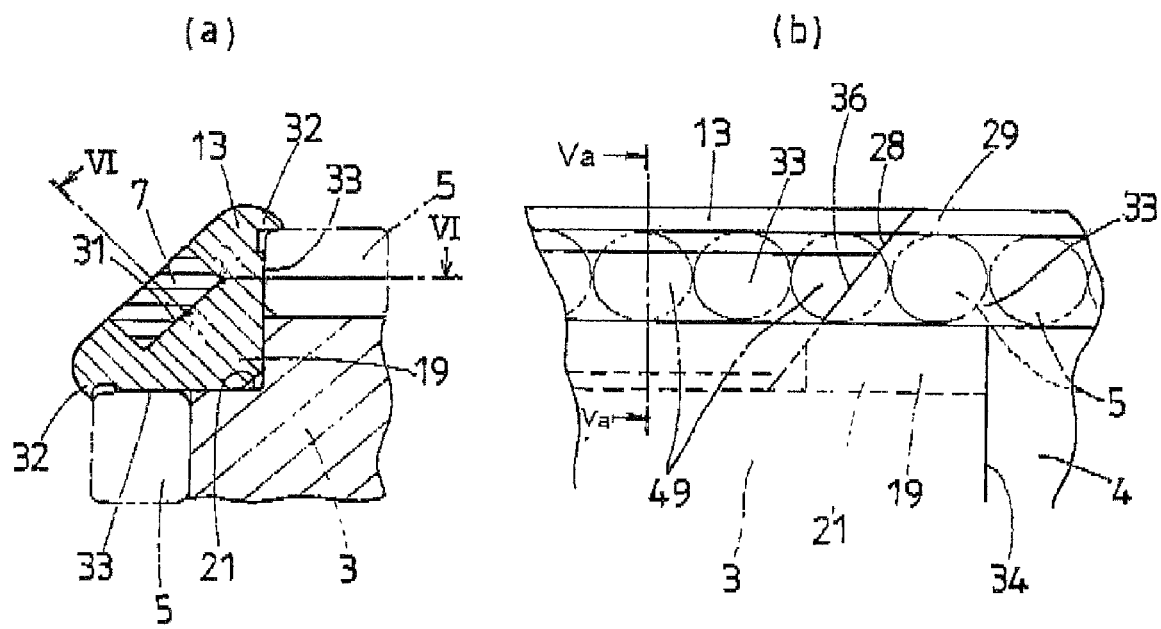
Figure 12:
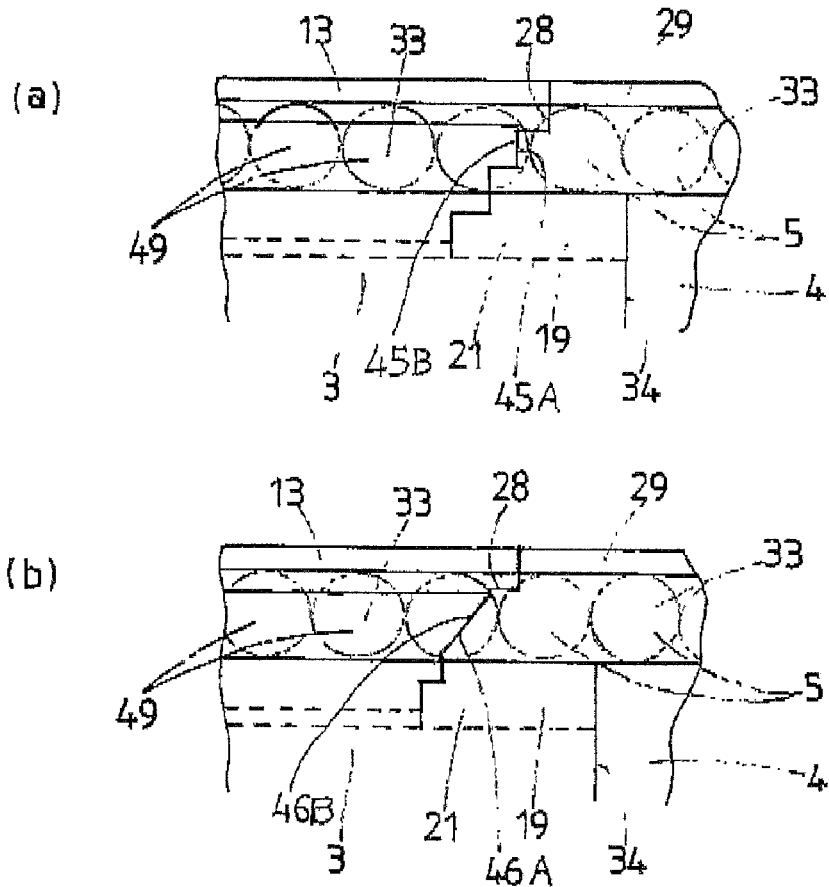

According to an embodiment shown in FIG. 5(b) of the linear motion guide unit of the present invention, butting extremities of the retainer plate 13 and the spigots 29 are made slanted to have bevels 36 in complementary relation to one another to provide an interlocking construction 28 where the extremities of the retainer plate 13 and the spigots 29 come into close contact against each other in a fashion the retainer plate 13 fits over the spigot 29 in the siding direction. That is, the retainer plate 13 comes into engagement with the spigots 29 raised above the rearward end of the end cap 4. More particular, the extremities of the retainer plate 13 and the spigots 29 are made complement each other, namely, bevels 36 in this embodiment, rather than merely butting against one another. The geometry of the interlocking construction 28, not just the bevel 36, may be made other versions, for example, another geometry as shown in FIG. 12(a) in which butting extremities of the retainer plate 13 and the spigots 29 are shouldered to have a stepwise end 45A of the retainer plate 13 and stepwise ends 45B of the spigots 29 in complementary relation to one another to provide an interlocking construction 28 where the extremities of the retainer plate 13 and the spigots 29 come into close contact against each other. As an alternative of the interlocking construction 28; the butting extremities of the retainer plate 13 and the spigots 29 as shown in FIG. 12(b) are made into a stepwise bevel end 46A of the retainer plate 13 and stepwise bevel ends 46B of the spigots 29 in complementary relation to one another to provide an interlocking construction 28 where the extremities of the retainer plate 13 and the spigots 29 come into close contact against each other.

With the linear motion guide unit of the present invention, more than one cylinder or roller 5 as shown in FIG. 2, when rolling on the raceway surface 12 through the load-carrying race 20 defining the load-carrying race 20 along the carriage 3, is borne on any one of axially opposite ends 49 thereof in sliding-contact relation against a guide surface 33 of the retainer plate 13 while on another end thereof against an inward surface 53 edging partially a recess 52 in the carriage 3. Thus, the guide surface 33 of the retainer plate 13 and the inward surface 53 of the carriage 3 work in combination to guide orderly the rollers 5. The guide surface 33 of the retainer plate 13 to support or bear any one of the axially opposite ends of the roller 5 is designed to communicate with another guide surface, not shown, of the turnaround passage 30 in the end cap 4 to continuously guide the same axial end 49 of the roller 5. The retainer plate 13, besides the guide surface 33 made along the load-carrying race 20 to support any one of the axially opposite ends 49 of the roller 5 in the load-carrying race 20(F1), has another guide surface 33 extending along the load-carrying race 20 to support another one of the axially opposite ends 49 of the roller 5 in the load-carrying race 20(F2). The guide surfaces 33 extending in parallel relation, when viewed in transverse section as in FIG. 5(a), cross each other at right angles to form an isosceles triangle having two equal sides of the guide surfaces 33. Thus, the retainer plate 13 is designed to have the guide surfaces 33 to equally support or bear all the rollers 5 rolling through the paired circulating circuits and also guide the associated axial ends 49 of the rollers 5, respectively. The retainer plate 13 is flanked by the load-carrying races 20 in the slider 2 in such a way that the rollers 5 charged in the circulating circuits are born on their axially ends 49 against the guide surfaces 33 in a sliding-contact relation. On the back of the retainer plate 13, there is made a lengthwise groove 31 to fit over the binding strip 7. With the linear motion guide unit of the present invention, moreover, the carriage 3 is made with a groove 21, which extends along the load-carrying race 20 to fit over a wedged ridge 19 where the retainer plate 13 comes into mating with the spigot 29 of the end cap 4. The retainer plate 13 is fastened in place in such a manner that a crest of the wedged ridge 19 in which the two equal sides meet lengthwise each other fits snugly into the groove 21 of V-shape formed between the paired raceway surfaces 12 cut on the carriage 3.

The retainer plate 13 is made at the lengthwise opposite ends thereof to fit over the ends of the spigots 29 of the end caps 4 from the outside. On assembly of the slider 2, therefore, the end caps 4 are first combined with the carriage 3 and the rollers 5 are charged into the circulating circuits from the load-carrying races 20. Thereafter, the retainer plate 13 is brought into detachable fit into the V-shaped groove 21 in a way fitting over the spigots 29 of the end caps 4 from the outside. As seen in FIG. 5(b), the guide surface 33 of the retainer plate 13 is not cut off to cross at right angles relative to the traveling or running direction, but cut aslant to make, especially as illustrated in the embodiment, mating bevels 36 at the interlocking construction 28 between the retainer plate 13 and the spigot 29 of the end cap 4, helping the axially opposite ends 49 of the rollers 5, even though miniature or very small rollers 5, creep gradually across the interlocking construction 28, making sure of smooth travel of the rollers 5 with no influence of some gaps. Locations of the interlocking constructions 28 where the retainer plate 13 fits over the spigots 29 raised above the ends of the end caps 4, moreover, are different from positions in which the lengthwise opposite ends 34 of the carriage 3 comes into abutment against their associated end caps 4 or transits between the load-carrying races 20 and the turnaround passages 30. This means that the interlocking construction 28 lies in the straight load-carrying race 20 in which the rollers 5 hardly change in rolling posture during traveling, so that the rollers 5 are ensured certainly to roll with smoothness and steadiness for a long-lasting operation. Moreover, the interlocking construction 28 in which the spigots 29 of the end caps 4 fit closely into the V-shaped grooves 21 in the carriage 3 with making engagement with the retainer plate 13 is hardly causes any discrepancy in location among the interlocking constructions 28, thus ensuring the smooth, steady traveling of the rollers 5 over the long-lasting service.

Figure 3:
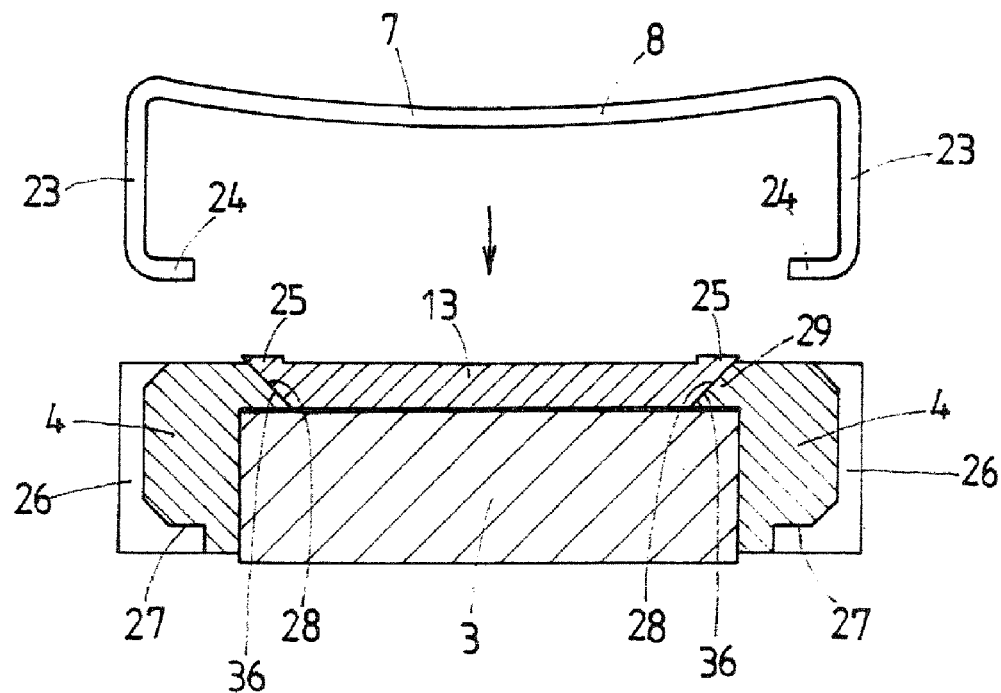
FIG. 3 is an exploded view in transverse section taken along a plane of the line III-III of FIG. 2, showing a situation prior to assembly.
Figure 4:
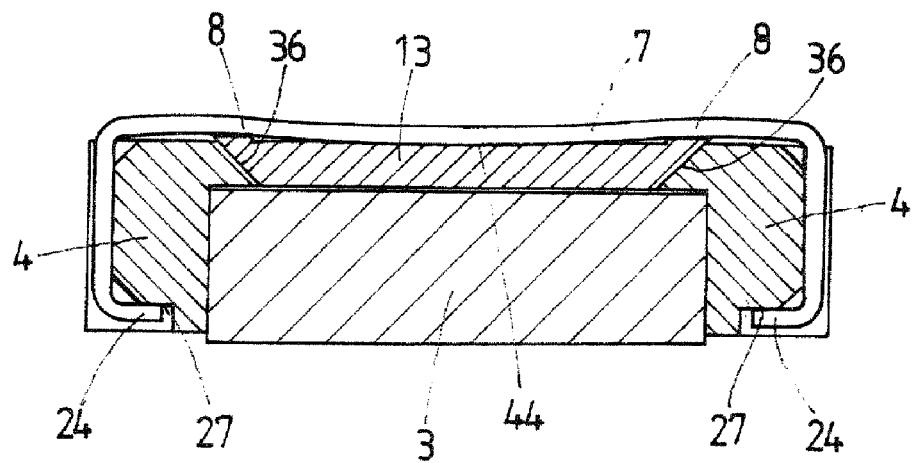
FIG. 4 is a view same as FIG. 3, but after being assembled.
Figure 6:
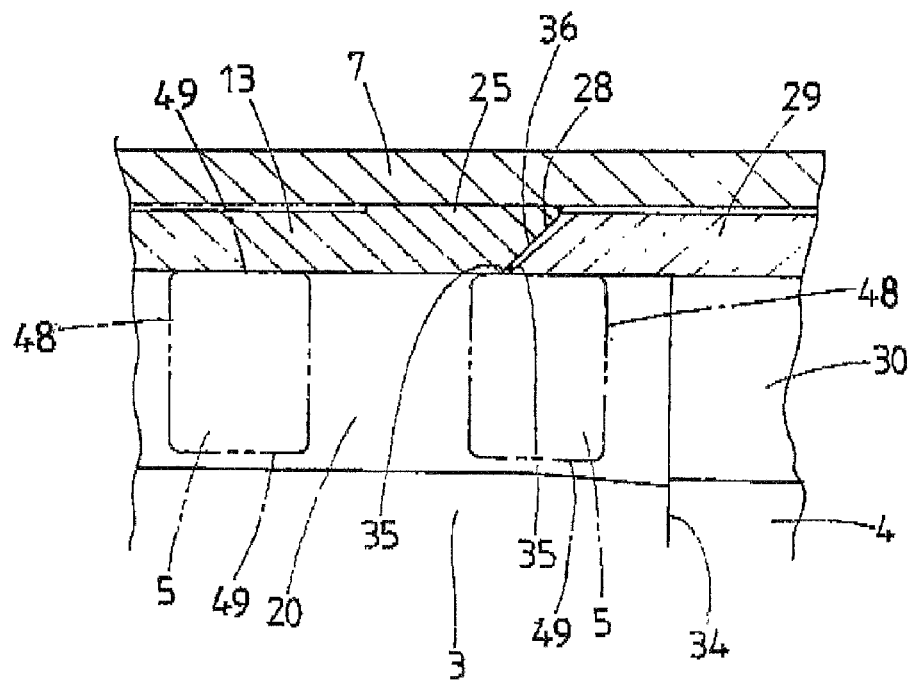
FIG. 6 is a fragmentary view in section explanatory of butting relation of the retainer plate against the carriage as well as the end cap, which is taken along a plane of the line VI-VI of FIG. 5(a) to contrast with the prior construction in FIG. 13.
Figure 13:
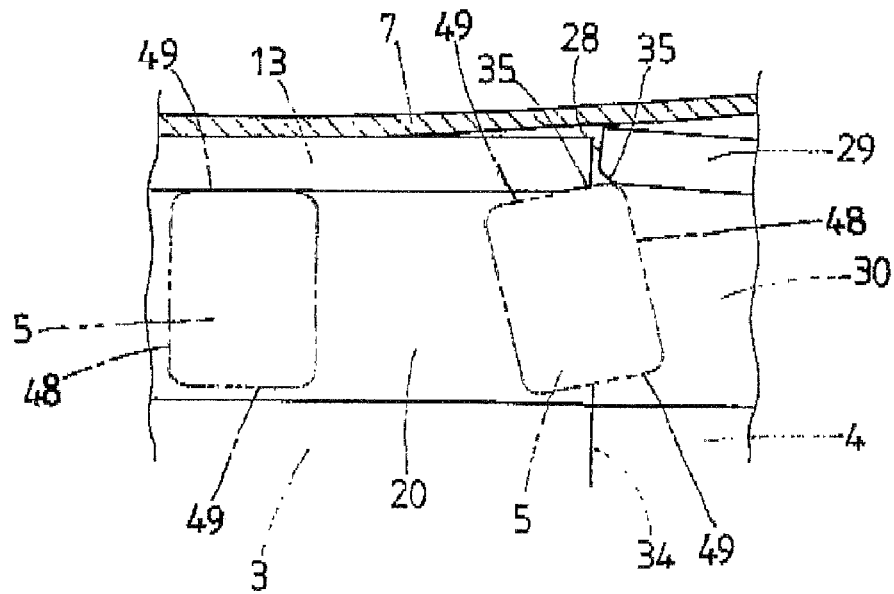
FIG. 13 is a view explanatory of conventional butting construction of the retainer plate.

With the linear motion guide unit of the present invention, the retainer plate 13 as shown in FIGS. 3 and 4 is made at opposite ends thereof with raised portions 25, which are squeezed by the application of the binding strip 7 to firmly fasten the retainer plate 13 against the carriage 3. The binding strip 7 is warped around the middle thereof to get convex towards the carriage 3 to form a somewhat flexed middle 8. On combining of the binding strip 7 with the retainer plate 13, the binding strip 7 is pressed against the raised portions 25 at the lengthwise opposite ends of the retainer plate 13 as shown in FIG. 4, thereby borne against the retainer plate 13 mainly at three points of lengthwise opposite raised ends 25 and a pressed middle 44 of the retainer plate 13 to hold firmly the retainer plate 13 in the groove 21. The binding strip 7 serves to keep firmly the interlocking construction 28 in place between the opposite ends thereof with the help of flexible property as stated earlier, without causing any deformation in the spigots 29 of the end caps 4. The binding strip 7 is worked to have the major flexed middle 8 extending lengthwise in parallel with the retainer plate 13, lengthwise opposite ends 23 bent at right angles relative to the major flexed middle 8 to fit into the grooves 26 cut in the end caps 4 and hooked extremities 24 further bent at right angles relative to the bent ends 23 to come into engagement with notches 27 in the end caps 4. Referring again to FIG. 6 along with FIG. 5 in comparison with FIG. 13 illustrating the prior construction, the rollers 5 are kept from entangled into the chamfered area 35 at the interlocking construction 28 between the retainer plate 13 and the spigot 29 of the end cap 4, so that the interlocking construction 28 is free from any deformation, which would disturb smooth guidance of the axially ends 49 of the rollers 5.

Figure 7:
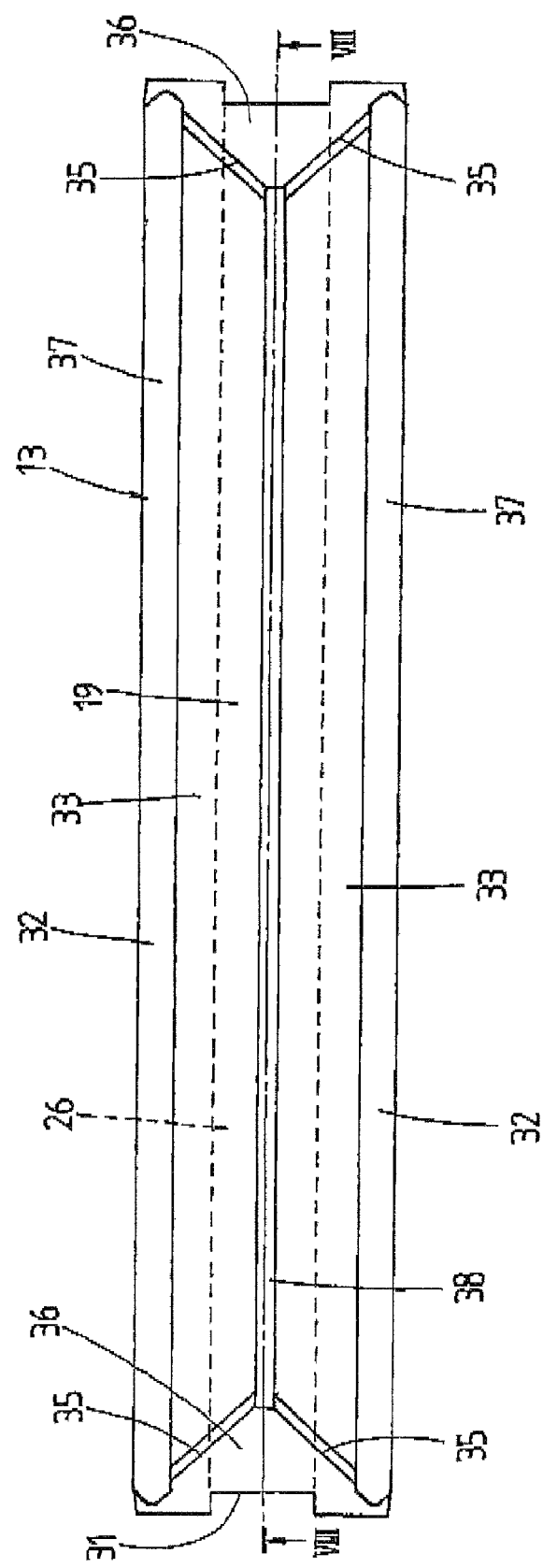
FIG. 7 is a view in plan showing a preferred embodiment of the retainer plate of FIG. 1.
Figure 8:
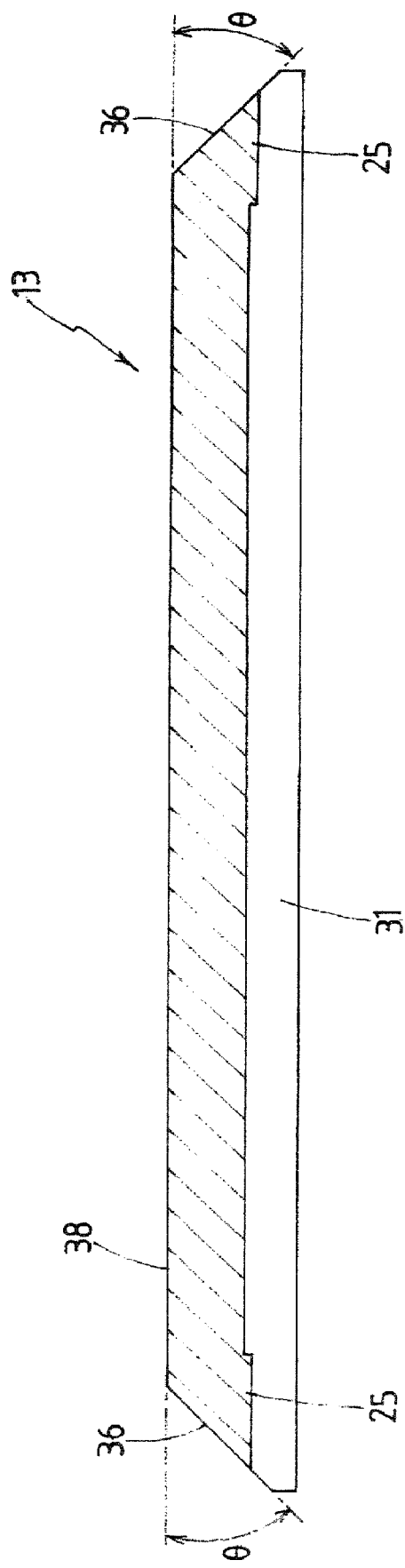
FIG. 8 is a view in longitudinal section of the retainer plate, taken along a plane of the line VIII-VIII of FIG. 7.
Figure 9:
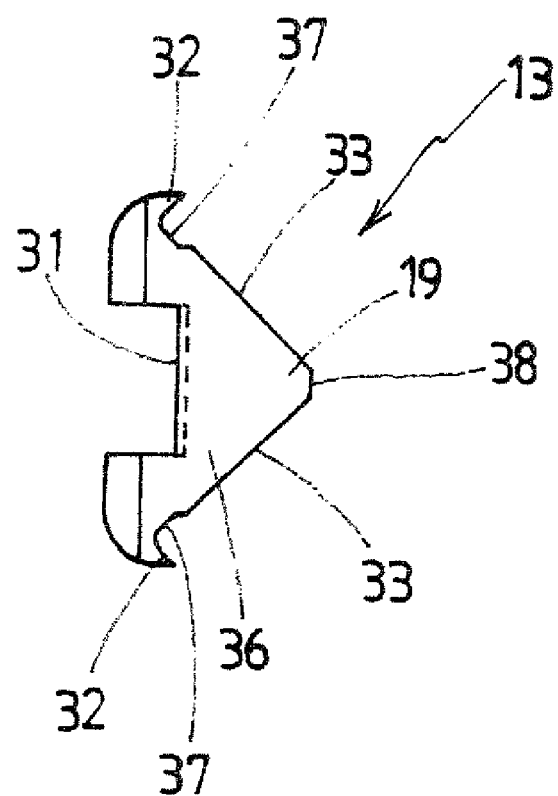
FIG. 9 is a view in end elevation showing the retainer plate of FIG. 7.

As seen in FIGS. 7 to 9, the retainer plate 13 has the lengthwise opposite ends each of which is cut aslant to make the bevel 36 that conforms to the spigot 29 of the end cap 4. The retainer plate 13, as stated earlier, has the guide surfaces 33 to hold the rollers 5 in the paired circulating circuits in a way bearing the rollers 5 on their axially opposite ends 49 in sliding-contact relation. The guide surfaces 33, when viewed in transverse section, cross each other at right angles along a lengthwise crest 38 extending in the sliding direction to form an isosceles triangle having two equal sides of the guide surfaces 33. On the opposite side of the retainer plate 13, the lengthwise groove 31 is made to receive therein the binding strip 7. The lengthwise opposite ends of the retainer plate 13 as shown in FIG. 8 are each designed to make the bevel 36, which splays out from the crest 38 between the two equal sides of the guide surfaces 33 at an angle .theta. (for example, .theta.=45.degree.) of inclination in the lengthwise direction. With the retainer plate 13, moreover, the extensions focusing on the crest 38 in flush with the guide surfaces 33 form together the wedged ridge 19, which is to come into mating with groove walls of the groove 21. The retainer plate 13 is made with relief grooves 37 (especially refer to FIG. 9) along lengthwise sides of the guide surfaces 33. Raised lips 32 are made lengthwise or in the sliding direction on most outlying edges of the relief grooves 37 to keep the rollers 5 against falling away. With the retainer plate 13, further, the raised portions 25 as shown in FIG. 8 are made on the bottom of the groove 26 at the lengthwise opposite ends thereof.

The turnaround passages 30 in the sidewise bulged portions of the forward and aft end caps 4, as shown in FIG. 10, are made to intersect one other in each bulged portion in such a staggered relation that any one of the turnaround passages 30 is further out than the other. In the illustration, there is shown an end cap major body to complete the end cap 4 in combination with a spacer piece, not shown. Curved outside surfaces flanked by side walls to define the turnaround passages 30 are shown as looking into the interior of the end cap major body. The curved outside surfaces in the turnaround passages 30 serve guiding the rolling surface 48 of the roller 5 on line contact while the side walls serve as the guide surfaces 33 coming into contact with the axially opposite ends 49 of the roller 5. Paired turnaround passages 30 in any one sidewise bulged portion of the end cap 4 are designed to make connection with their associated load-carrying races 20 inside the bulged portion. On the ends of the turnaround passages 30 to come into connection with their associated load-carrying races 20, there are made the spigots 29 in a way extending out of the ends of the turnaround passages 30. The spigots 29 are each made at their inside middle with the groove 31 in a way extending from the back towards the front, that is, lengthwise to fit over the binding strip 7. The extremities of the spigots 29 are cut aslant to make the same bevel 36 as the beveled ends of the retainer plate 13. The bevel 36 is made to extend on inside both sides at an angle θ (for example, θ=45°) of inclination, reaching the crossing point with the associated turnaround passage 30. Extension of the spigot 29 is determined in length to be upwards of a length equivalent to a diameter of one roller 5 from the end of the end cap 4. Thus, the spigot 29 comes into engagement with the retainer plate 13 at a position lying a diameter of one roller 5 away from the end of the end cap 4, helping the rollers 5 traveling more in smooth and steady than ever. The groove 26 to fit over the binding strip 7 extends to turn to the front from the fore-and-aft hole 9 and then to the side, terminating in the notch 27 into which the binding strip 7 fits at any one of the opposite ends 24, as shown in FIG. 11.

What is claimed is:
1. A linear motion guide unit comprising:
an elongated guide rail having a first lengthwise raceway surface thereon, and
a slider being lengthwise movable along the elongated guide rail, the slider being comprised of:
a carriage made therein with a second raceway surface in opposition to the first raceway surface and a return passage extending in parallel with a load-carrying race defined between the first and second raceway surfaces,
end caps mounted on lengthwise opposite ends of the carriage and made therein with turnaround passages connecting the load-carrying race with the return passage,
more than one roller capable of rolling through a circulating circuit composed of the load-carrying race, the return passage, and the turnaround passages,
a retainer plate extending lengthwise in opposition to the load-carrying race to keep the roller in the load-carrying race, and
a binding strip to fasten the retainer plate to the carriage;

wherein the end caps each have spigots extending out of an end of the end cap to come into communication with the turnaround passages, while the retainer plate has lengthwise opposite ends to make connections with the spigots of the end cap to guide axially opposite ends of the roller, and the lengthwise opposite ends of the retainer plate conform to ends of the spigots in a complementary relation to fit over the ends of the spigots in a sliding direction.

2. A linear motion guide unit constructed as defined in claim 1, wherein butting extremities of the retainer plate and the spigots are made beveled ends, stepwise ends or stepwise bevel ends in complementary relation to one another aslant in the sliding direction.

3. A linear motion guide unit constructed as defined in claim 1, wherein the retainer plate is made at opposite ends thereof with raised portions, which are squeezed by application of the binding strip to firmly fasten the retainer plate against the carriage.

4. A linear motion guide unit constructed as defined in claim 3, wherein the binding strip is warped around a middle area thereof to get convex towards the carriage to form a flexed middle, and wherein the binding strip fastened to the retainer plate with lengthwise opposite hooks coming into engagement with notches of the end caps is borne against the retainer plate at three points of lengthwise opposite raised ends and the convex middle of the retainer plate to keep firmly the retainer plate in place relative to the carriage.

5. A linear motion guide unit constructed as defined in claim 1 wherein the carriage is made with a groove, which extends along the load-carrying race to fit over a wedged ridge where the retainer plate comes into mating with the spigot of the end cap.

6. A linear motion guide unit constructed as defined in claim 1, wherein a pair of the circulating circuit is made to each of sidewise bulged portions of the slider, and wherein the retainer plate is arranged between the paired circulating circuits and provided with guide surfaces to bear the rollers rolling through the load-carrying races against their axially opposite ends.

* * * * *